United States Patent Office 3,536,767
Patented Oct. 27, 1970

3,536,767
MANUFACTURE OF PYROCATECHOL
Edmund H. Sommerfield, Bay City, Mich., assignor to The Dow Chemical Company, Midland, Mich., a corporation of Delaware
No Drawing. Filed Apr. 6, 1967, Ser. No. 628,832
Int. Cl. C07c 39/08
U.S. Cl. 260—629                 6 Claims

ABSTRACT OF THE DISCLOSURE

In the preparation of pyrocatechol by the alkali hydrolysis of o-chlorophenol, production of byproducts such as resorcinol and polynuclear polyphenols is minimized by using an effective amount of a copper hydrolytic catalyst and excess aqueous alkali metal hydroxide of about 60–85 weight percent concentration as the hydrolying reagent and carrying out the reaction at 160–240° C. The process desirably includes maintaining the concentration of aqueous free alkali substantially within the specified concentration during the hydrolysis.

BACKGROUND OF THE INVENTION

This invention relates to an improved chemical process for reacting an alkali metal base with a chlorophenol to produce the corresponding dihydroxybenzene. The invention relates particularly to such a process whereby o-chlorophenol is hydrolyzed in a substantially liquid reaction mixture and in the presence of a copper hydrolytic catalyst to obtain high yields of pyrocatechol.

Pyrocatechol has been made by various methods including the alkali fusion of o-phenolsulfonic acid and the alkaline hydrolsis of o-dichlorobenzene or o-chlorophenol. The known procedures have entailed particularly disadvantages in each case which have limited the commercial use of these methods. For example, the alkali fusion process involves handling a molten reaction mixture and the relatively high temperature required by this method causes rearrangement so that the hydrolyzed product often contains a considerable or even a predominant proportion of resorcinol and other byproducts in addition to the desired pyrocatechol. Similarly, high temperature hydrolysis in solution of o-dichlorobenzene or o-chlorophenol also produces large quanties of resorcinol and phenolic byproducts of higher molecular weight. It is known that a copper hydrolytic catalyst can facilitate the reaction. However, catalyzed hydrolyses which have been run at lower temperatures and in more dilute solution to avoid resorcinol product have required unduly long reaction times in order to obtain a practical degree of reaction.

It would be desirable to have available a convenient process which would provide good yields of pyocatechol with little production of resorcinol and other byproducts. It would be particularly desirable to have such a process which would operate at moderate levels of temperature and pressure.

SUMMARY OF THE INVENTION

It has now been found that these desirable objectives are attained by a process which comprises reacting at 160–240° C. a substantially liquid mixture consisting essentially of o-chlorophenol, 4–8 mole equivalents of aqueous alkali metal hydroxide of about 60–85 weight percent concentration, and an amount of a copper hydrolytic catalyst equivalent to at least about 0.5 percent of copper based on the weight of o-chlorophenol. This process is desirably carried out in such a way that the concentration of aqueous free alkali metal hydroxide is maintained substantially within the specified range throughout the reaction period.

Under these conditions, the hydrolytic reaction takes place at near and preferably at atmospheric pressure and it is substantially complete in 0.5–5 hours. The phenolic product is largely pyrocatechol with only minor proportions of resorcinol and phenolic byproducts of higher molecular weight.

DETAILED DESCRIPTION

Any alkali metal hydroxide is operable in the present process although the relative proportions of pyrocatecol and the various byproducts in the reaction product may change slightly depending upon the particular base which is used. The hydroxides of lithium, sodium, potassium, cesium, and rubidium or mixtures thereof all give similar results. Sodium hydroxide is preferred for economic reasons.

The alkali metal hydroxide must be used in substantial excess over the theoretical three moles per mole of o-chlorophenol. As specified above, 4–8 moles of base can be used and 5–7 moles per mole of o-chlorophenol is preferred. The hydrolysis is carried out in such a way that the alkali metal hydroxide is maintained in excess throughout the reaction. The reactants can be combined at the start of the process or the chlorophenol can be added portionwise to the alkali metal hydroxide solution as the reaction progresses.

The hydrolysis is preferably operated under substantially normal atmospheric pressure although operation within the limits of the process is possible at slightly below or above one atmosphere, for example, at 0.5–5 atmospheres. At any pressure within these limits, it is usually necessary to distill some water from the reaction mixture to maintain the concentration of free alkali metal hydroxide in the remaining water substantially within the defined range. Ordinarily, the amount of water thereby removed is about the water of reaction or slightly in excess of that amount. However, it is possible to retain all or most of the water of reaction in the reaction mixture and still stay within the limits of the process by starting with a relatively high concentration of alkali and running under moderate super-atmospheric pressure as defined above.

Within the process limits as set forth, a lower concentration of alkali metal hydroxide favors a higher pyrocatechol to resorcinol ratio. As the free alkali concentration drops below about 60 percent, the rate of reaction decreases to the point where reaction times are impractically long. At free alkali concentrations above about 85 percent, not only does the production of resorcinol increase to an undesirable level, but at this aqueous free alkali concentration and at lower caustic/chlorophenol ratios, the reaction mixture becomes viscous and hard to handle in normal production equipment. Within the defined limits, the reaction mixture is substantially liquid, i.e., the free alkali and at least a substantial part of the alkali phenates remain in aqueous solution although there may be a significant amount of solid phenate and alkali chloride present.

The reaction temperature has an effect somewhat similar to that of the alkali base concentration, for high temperatures favor increasing resorcinol and polynuclear polyphenolic byproduct formation. These polynuclear phenols are largely compounds containing two to three benzene rings per molecule and they are characteristically hydroxypolyphenyls and hydroxylated polyphenyl ethers. Temperatures below about 160° C. cause impractically low conversions or excessive reaction times. Process temperatures are preferably within the range 180–220° C. for best results and most convenient operation.

A critical element in the present process is the copper hydrolytic catalyst. This can be any such catalyst known to be useful in the alkaline hydrolysis of an ar-haloaromatic to an ar-hydroxyaromatic compound. Included are copper metal, copper oxide or hydroxide, and any copper compound which reacts to form a copper oxide or hydroxide under the conditions of the process. Preferably, the catalyst is finely divided copper or copper oxide, particularly cuprous oxide. Not only a copper catalyst but a minimum quantity of that catalyst is needed to obtain the substantial benefit of the present invention. At least enough catalyst is employed to provide about 0.5 percent of elemental copper based on the weight of o-chlorophenol and preferably, one percent or more. Little additional chemical advantage is obtained by using more than about 5 percent of copper and a larger quantity involves some mechanical disadvantage in handling and working up the reaction mixture. In order to obtain best results, at least the above minimum amount of catalyst should be present in the reaction mixture during substantially all of the reaction period.

A preferred mode of operating the present process includes forming a mixture of about six moles of 70–80 percent aqueous sodium hydroxide and 1–2 percent of finely divided copper as such or as cuprous oxide based on the weight of o-chlorophenol to be added, heating the mixture to 180–220° C., maintaining the mixture at this temperature while adding a mole of o-chlorophenol at substantially atmospheric pressure and continuing heating the mixture at this temperature and pressure until at least about 90 percent of the organic chlorine has been hydrolyzed and water to the extent of 0.5–2 times the weight of the theoretical water of reaction has been distilled from the mixture. The reaction mixture can be worked up to separate the pyrocatechol product by any convenient known procedure. A satisfactory method includes acidifying the cooled and diluted reaction mixture, separating the phenolic layer thereby liberated, and distilling to obtain the pyrocatechol. The examples illustrate various modes of operation.

EXAMPLE 1

A nickel reactor was charged with 60 g. moles of sodium hydroxide as an 80% aqueous solution and 22 g. of copper powder. This mixture was stirred while being heated to 210° C., at which point 1285 g. (10 g. moles) of o-chlorophenol was added over a period of 20 minutes through a dip pipe extending to near the bottom of the reactor. The temperature of the reaction mixture was held at 210° C. during the addition. Water started distilling from the reactor soon after the beginning of the chlorophenol addition. After the o-chlorophenol had been added, the reaction mixture was held at 210° C. for another 30 minutes while a blanket of nitrogen was maintained in the reactor. A total of 560 ml. of water was distilled from the reactor, resulting in a final concentration of aqueous free sodium hydroxide in the mixture of 76%. The reaction mixture was cooled and diluted with a liter of water, then poured into a mixture of ice and excess concentrated hydrochloric acid. The acidified mixture was filtered to recover the copper powder and the phenolic products were extracted from the filtrate with isobutyl alcohol. Water was distilled from the extract and precipitated salt was filtered from the dry solution. The filtered solution was then distilled to remove isobutyl alcohol and the phenolic residue was distilled under reduced pressure to obtain fractions which were analyzed to determine the composition of the phenolic product as follows:

|  | G. |
|---|---|
| Recovered o-chlorophenol | 12.7 |
| Pyrocatechol | 793.6 |
| Resorcinol | 122.4 |
| Dinuclear phenols | 85.3 |
| Trinuclear phenols (residue) | 33.7 |

An additional 34.7 grams of o-chlorophenol was recovered by redistillation of the alcohol fraction.

The dinuclear and trinuclear phenols were mixtures of condensation products such as oxydiphenols, biphenols, phenylenedioxydiphenols, and polyhydroxytriphenyls. The above product composition indicates a conversion of o-chlorophenol of 96.3% and a yield of pyrocatechol of 74.8% based on the chlorophenol converted.

EXAMPLES 2–7

A series of runs were made using essentially the same conditions and quantities of reactants as in Example 1 except that 22 g. of cuprous oxide was used as the copper catalyst and the temperature was varied while the reaction time was held substantially constant. The results are summarized below:

| Ex. No. | Temp., °C. | Conversion, percent | Recovery, percent phenolics | Wt. percent product distribution | | |
|---|---|---|---|---|---|---|
| | | | | Pyrocatechols | Resorcinol | Highers |
| 2 | 165 | 29.5 | 92.2 | 93.7 | 0.2 | 6.1 |
| 3 | 185 | 67.0 | 84.5 | 92.6 | 1.8 | 5.6 |
| 4 | 195 | 86.4 | 95.1 | 89.1 | 3.8 | 7.1 |
| 5 | 210 | 97 | 96 | 77 | 14 | 9 |
| 6 | 230 | 97 | 95 | 56 | 24 | 20 |
| 7 | 270 | 99 | 96 | 37 | 35 | 27 |

The figures for recovery of phenolics are essentially material balances and refer to total moles of phenolics out based on the starting chlorophenol. Example 7 illustrates what happens at temperatures above those of the present process, i.e., the proportions of resorcinol and higher molecular weight phenolics increase at the expense of the pyrocatechol.

EXAMPLES 8–10

Three experiments were run essentially as in Example 1 using the same temperature and quantities and proportions of reactants but varying the amount of water to obtain different starting concentrations of sodium hydroxide. In each experiment, water was distilled from the mixture as the reaction progressed and the final concentration of free sodium hydroxide was essentially unchanged from the starting concentration. The results were as follows:

| Ex. No. | Percent NaOH | Conversion, percent | Recovery, percent phenolics | Wt. percent distribution, product | | |
|---|---|---|---|---|---|---|
| | | | | Pyrocatechol | Resorcinol | Highers |
| 8 | 73 | 96 | 89 | 77 | 10 | 13 |
| 9 | 80 | 96 | 99 | 77 | 12 | 11 |
| 10 | 85 | 97 | 96 | 77 | 14 | 9 |

It is seen that as the concentration of the sodium hydroxide was increased, the ratio of pyrocatechol to resorcinol in the product steadily decreased from 7.7:1 at 73% to 5.6:1 at 85%.

EXAMPLES 11–14

Four reactions were run at 210–212° C. using amounts and proportions of catalyst and reactants as in Example 1 but with varying amounts of water to obtain different starting concentrations of sodium hydroxide and using different reaction procedures to vary the final concentration of free sodium hydroxide in the product mixture. These procedures were as follows:

Example 11—ran at 0.6 atmosphere and distilled off 1.7 times the theoretical water of reaction to increase the original concentration of free sodium hydroxide above 85 percent.

Examples 12, 13—similar to Example 11 but at atmospheric pressure and caustic concentration maintained essentially constant.

Example 14—ran at the autogenous pressure of the system (2–2.8 atmospheres), no water distilled out.

The results are tabulated below:

| Ex. No. | Wt. percent aqueous NaOH | | Conversion, percent | Wt. percent product distribution | | |
|---|---|---|---|---|---|---|
| | Initial | Final | | Pyro-catechol | Resorcinol | Highers |
| 11 | 85 | ¹ 90 | 99 | 60.8 | 19.9 | 19.2 |
| 12 | 85 | ¹ 85 | 97 | 77 | 14 | 10 |
| 13 | 73 | ¹ 73 | 96 | 77 | 10 | 13 |
| 14 | 73 | 54 | 72 | 77 | 12 | 10 |

¹ About.

Examples 12 and 13 show that essentially the same results are obtained at NaOH concentrations of 73% and 85%. Too high a concentration of NaOH in Example 11 produced excessive proportions of resorcinol and highers while retention of water of reaction in Example 14 caused a drop in conversion because of decreasing NaOH concentration.

EXAMPLES 15–18

Four experiments were run following the procedure and the conditions of Example 1 except that the kind and concentration of copper catalyst were varied. In Examples 15–17, the copper was supplied as cupric chloride which was added portionwise to the mixture throughout the reaction period. In Example 18, the catalyst was cuprous oxide, all of which was present in the reaction mixture at the start. Results are listed in the table below:

It is seen from Examples 15–17 that while the concentration of copper has no significant effect on the degree of reaction under the process conditions, it has a pronounced effect on the yield of pyrocatechol. Example 18 illustrates the advantage of having all of the copper catalyst present throughout the reaction, for essentially the same product distribution was obtained with about a third the quantity of copper used in Example 15.

I claim:

1. A process for making pyrocatechol which comprises reacting at 160–220° C. a substantially liquid mixture consisting essentially of o-chlorophenol, 4–8 moles of alkali metal hydroxide as an aqueous solution of 60–85 percent by weight concentration, and an amount of a copper hydrolytic catalyst equivalent to at least about 0.5 percent of copper based on the weight of chlorophenol to obtain a substantial degree of hydrolysis of the o-chlorophenol while maintaining the concentration of aqueous free alkali metal hydroxide substantially within the above-specified range.

2. The process of claim 1 wherein the alkali metal hydroxide is sodium hydroxide.

3. The process of claim 2 wherein 5–7 moles of sodium hydroxide is employed per mole of o-chlorophenol.

4. The process of claim 2 wherein the reaction time is 0.5–5 hours.

5. The process of claim 1 wherein the reaction is carried out substantially at normal atmospheric pressure.

6. The process of claim 1 wherein the concentration of aqueous alkali metal hydroxide is maintained at the defined range of concentration by distilling from the reaction mixture a quantity of water equal to 0.5–2 times the theoretical quantity of water of reaction.

| Ex. No. | Cu, wt. percent | Conversion, percent | Recovery, percent phenolics | Wt. percent product distribution | | |
|---|---|---|---|---|---|---|
| | | | | Pyro-catechol | Resorcinol | Highers |
| 15 | 0.46 | 96 | 99 | 37 | 29 | 34 |
| 16 | 2.3 | 97 | 98 | 64 | 20 | 17 |
| 17 | 4.6 | 96 | 98 | 70 | 16 | 14 |
| 18 | 0.16 | 97 | 99 | 31 | 29 | 39 |

References Cited

UNITED STATES PATENTS 1,934,656 11/1933 Britton _____ 260—629
2,041,592 5/1936 Burrough _____ 260—629

FOREIGN PATENTS 269,544 2/1914 Germany.

OTHER REFERENCES

Hale et al.: Industrial and Eng. Chem., vol. 20, pp. 114–118 (1928).

BERNARD HELFIN, Primary Examiner

W. B. LONE, Assistant Examiner

U.S. Cl. X.R.

260—625